United States Patent [19]

Overbeek et al.

[11] Patent Number: 4,983,662
[45] Date of Patent: Jan. 8, 1991

[54] POLYURETHANE COATING COMPOSITIONS

[75] Inventors: Gerardus C. Overbeek, Sprang-Capelle; Martinus P. J. Huets, Echt, both of Netherlands

[73] Assignee: ICI Resins b.v., Waalwijk, Netherlands

[21] Appl. No.: 318,187

[22] Filed: Mar. 2, 1989

[30] Foreign Application Priority Data

| Mar. 9, 1988 [GB] | United Kingdom | 8805562 |
| Mar. 9, 1988 [GB] | United Kingdom | 8805563 |
| Mar. 9, 1988 [GB] | United Kingdom | 8805564 |

[51] Int. Cl.$^5$ .................... C08G 18/04; C08L 75/12; C08L 75/14
[52] U.S. Cl. ............................ 524/501; 524/507; 524/591; 524/839; 524/840
[58] Field of Search ............... 524/501, 507, 591, 839, 524/840

[56] References Cited

U.S. PATENT DOCUMENTS

| 3,862,074 | 1/1975 | Hickey | 524/507 |
| 4,172,191 | 10/1979 | Nachtkamp et al. | 524/591 |
| 4,269,748 | 5/1981 | Nachtkamp et al. | 524/839 |
| 4,335,029 | 6/1982 | Dabi et al. | 524/840 |
| 4,452,834 | 6/1984 | Nachtkamp | 427/379 |
| 4,507,440 | 3/1985 | Engelhardt et al. | 524/501 |
| 4,543,144 | 9/1985 | Thoma et al. | 524/542 |
| 4,594,385 | 6/1986 | Thoma | 524/839 |
| 4,598,121 | 7/1986 | Disteldorf et al. | 528/61 |
| 4,652,466 | 3/1987 | Thoma | 427/244 |

Primary Examiner—Maurice J. Welsh
Assistant Examiner—Rabon Sergent
Attorney, Agent, or Firm—Cushman, Darby & Cushman

[57] ABSTRACT

Aqueous selfcrosslinkable coating composition comprising an aqueous dispersion of at least one polyurethane and having hydrazine (or hydrazone) functional groups and carbonyl functional groups disposed therein to provide a selfcrosslinking reaction, in which the polyurethane polymer takes part, via azomethine formation during and/or after film formation.

21 Claims, No Drawings

POLYURETHANE COATING COMPOSITIONS

This invention relates to aqueous coating compositions and more particularly to coating compositions comprising aqueous-dispersed polyurethane polymers.

Aqueous coating compositions comprising aqueous polyurethane dispersions are well known for the production of film coatings on various substrates such as wood, metal, fabrics, and plastics. These may be useful for the provision of, for example, protective or adhesive coatings, since polyurethanes possess very desirable properties such as good chemical resistance, abrasion-resistance, toughness, adhesion, and durability. Dispersion of the polyurethane in the aqueous system has been achieved either by the use of external surfactants or by including appropriate ionic or non-ionic groups in the polyurethane to render it self-dispersible in water.

It has been proposed in U.S. Pat. Nos. 4,335,029 and 4,598,121 to provide low temperature selfcrosslinkable aqueous polyurethane dispersions by incorporating hydrazide groups into the polyurethane chain and adding formaldehyde. The use of formaldehyde is however not always desirable for many applications, being a toxic and environmentally undesirable substance.

It has also been proposed to modify the properties of polyurethane dispersions by including vinyl polymers therein (where by a vinyl polymer in this specification we mean a polymer obtained by the free-radical addition polymerisation of at least one olefinically unsaturated monomer).

Thus, U.S. Pat. No 3,862,074 describes coating or binding compositions which are aqueous emulsions or dispersions of one or more acrylic polymers and one or more urethane polymers, the compositions being prepared by simply blending a polyurethane dispersion and an acrylic dispersion. The polyurethanes used are not self-dispersible, being merely reaction products of a diamine and a polypropylene glycol based prepolymer. Consequently, thickeners and surfactants are required to keep the polyurethane and acrylic solids in suspension.

Nonionic polyurethanes which are water-dispersible because of the presence of poly(ethylene oxide) side chains have been described in, for example, U.S. Pat. Nos 3,905,929, 3,920,598 and 4,190,566. All of these patents mention the possibility of blending aqueous dispersions of these polyurethanes with dispersions of vinyl monomers but without discussing the properties of the resulting blends.

Several patents describe processes wherein the vinyl polymer is formed in situ by polymerising one or more vinyl monomers in the presence of an aqueous polyurethane dispersion. In the processes of this type disclosed in U.S. Pat. Nos 3,705,164, 4,198,330 and 4,318,833, the polyurethanes owe their water-dispersibility to the presence of anionic salt groups. EP-A-189945 is also largely concerned with the polymerisation of vinyl monomers in aqueous dispersions of anionic polyurethanes but also describes the use of a cationic polyurethane and a prepolymer devoid of water-dispersing groups. A nonionic surfactant is used to disperse the latter in water.

None of above-described dispersions of polyurethane and vinyl polymers are selfcrosslinkable by virtue of interaction between the polyurethane and vinyl polymers.

We have now discovered novel aqueous coating compositions comprising polyurethane and, in certain embodiments, vinyl polymers which are selfcrosslinking at ambient or low temperatures, are storage stable, and do not incorporate formaldehyde to effect crosslinking.

Acording to the present invention there is provided an aqueous selfcrosslinkable coating composition comprising an aqueous dispersion which comprises at least one polyurethane polymer, wherein said composition has hydrazine (or hydrazone) functional groups and carbonyl functional groups present in the composition to provide a selfcrosslinking reaction, in which said at least one polyurethane polymer takes part, via azomethine formation from the reaction of hydrazine (or hydrazone) functional groups and carbonyl functional groups during and/or after film formation from the aqueous composition.

By azomethine formation is meant the formation of the grouping

as produced from the reaction of an organic hydrazine compound (such as a hydrazide), or an organic hydrazone compound, with a ketonic or aldehydic carbonyl compound. Thus in the composition of the present invention there are two co-reactable types of azomethine-formable functional groups which are employed and which react together on crosslinking to form azomethine groups, one type being hydrazine (or hydrazone) functional groups and the other type being carbonyl functional groups. The said at least one polyurethane polymer takes part in crosslinking by possessing at least one of chain pendant hydrazine (or hydrazone) functional groups and carbonyl functional groups.

For the purposes of this invention an "aqueous dispersion" means a dispersion of the polyurethane in an aqueous medium of which water is the principal component. Minor amounts of organic liquids may optionally be present For the sake of clarity, by a carbonyl functionality in this specification (unless specified otherwise) is meant the carbonyl functionality of a ketone or aldehyde group. Also, by a hydrazine functional group is meant the functional group of formula—$NHNH_2$. A hydrazone functional group is a group derived from such a hydrazine group by reaction with a monoketone or monoaldehyde containing at least 2 carbon atoms.

Certain embodiments of the present invention are directed to compositions which also include at least one vinyl polymer bearing carbonyl and/or hydrazine (or hydrazone) functional groups. In fact, there are three main embodiments X, Y, and Z envisaged for the compositions of the present invention, and embodiments Y and Z are concerned with certain compositions which include such vinyl polymers; these will be discussed at a later stage in this specification.

In embodiment X of the present invention there is provided a composition which comprises at least one polyurethane polymer bearing chain-pendant groups of one of the two types of co-reactable azomethine-formable functional groups (the two types being hydrazine (or hydrazone) groups, and carbonyl groups) and the composition also includes functional groups of the other type of azomethine-formable functional group (i.e. carbonyl where hydrazine (or hydrazone) is the first-mentioned type of group, or hydrazine (or hydrazone) if carbonyl is the first-mentioned type of group) located in one more of: at least one polyurethane polymer having chain-pendant groups of at least said other type, at least one non-polyurethanic non-vinylic compound having two or more groups of said other type (i.e. a compound in which the functional groups are not bound to polyurethane or vinyl polymer molecules), and at least one urethane oligomer having two or more groups of said other type. (Note, therefore, that it is possible in this embodiment for both types of functional group to be carried on the same polyurethane polymer molecule).

There are a number of different possibilities for embodiment X embraced by the scope of the present invention. Examples of these are as follows:

X(A) The polyurethane polymer component bears both chain-pendant hydrazine (or hydrazone) functional groups and chain-pendant carbonyl functional groups in the same polymer molecules.

X(B) The polyurethane polymer component bears chain-pendant hydrazine (or hydrazone) functional groups and chain-pendant carbonyl functional groups in different polyurethane polymer molecules, i.e. there will be at least two polyurethane polymers in the compositon and at least one of these will bear hydrazine (or hydrazone) groups but not carbonyl groups and at least one other of these will bear carbonyl groups but not hydrazine (or hydrazone) groups.

X(C) The polyurethane polymer component bears chain-pendant carbonyl functional groups and the composition includes non-polyurethanic non-vinylic polyhydrazine (or polyhydrazone) compound(s) (i.e. polyhydrazine or polyhydrazone compounds in which the hydrazine or hydrazone groups are not bound to polyurethane or vinyl polymer molecules) and/or urethane oligomer(s) having two or more hydrazine (or hydrazone) functional groups.

X(D) The polyurethane polymer component bears chain-pendant hydrazine (or hydrazone) groups and the composition includes non-polyurethanic non-vinylic polycarbonyl compound(s) (i.e. polycarbonyl compounds in which the carbonyl groups are not bound to polyurethane or vinyl polymer molecules) and/or urethane oligomer(s) having two or more carbonyl functional groups.

For the sake of clarity, in this specification a urethane oligomer has a weight average molecular weight of not more than 2000 (any urethane-chained material of greater molecular weight being considered as a polyurethane polymer).

It is evident that possibility X(D) excludes the use of formaldehyde as the carbonyl compound (for crosslinking purposes) since this would result in subsequent crosslinking via methylol formation rather than azomethine formation as required by this invention.

The composition of the invention extends to more than one of the possibilities X(A), X(B), X(C) and X(D) being employed at the same time (if this is practicable), e.g. a combination of X(A) and X(B) might be used.

It is preferred that in embodiment X of the invention, the composition contains hydrazine (or hydrazone) functional groups and carbonyl functional groups in a ratio of 1:50 to 50:1, more preferably 1:10 to 10:1.

In embodiment Y of the present invention there is provided an aqueous selfcrosslinking coating composition comprising an aqueous dispersion comprising at least one polyurethane polymer and at least one vinyl polymer and there are chain-pendant carbonyl and hydrazine (or hydrazone) functional groups which are complementarily incorporated in the polyurethane and vinyl polymers to provide a selfcrosslinking reaction via azomethine formation during and/or after film formation from the aqueous composition.

By the "complementary" incorporation of chain-pendant carbonyl and hydrazine (or hydrazone) functional groups in the polyurethane and vinyl polymers is meant that chain-pendant carbonyl functional groups present in one of the two types of polymer (i.e. polyurethane polymer or vinyl polymer) are reactable with chain-pendant hydrazine (or hydrazone) functional groups present in the other of the two types of polymer (to provide selfcrosslinking via azomethine formation).

There are a number of different possibilities embraced by the scope of embodiment Y of the present invention. Examples of these are as follows:

Y(A). The polyurethane polymer component bears chain-pendant carbonyl functional groups, and the vinyl polymer component bears chain-pendant hydrazine (or hydrazone) functional groups.

Y(B). The polyurethane polymer component bears chain-pendant hydrazine (or hydrazone) functional groups, and the vinyl polymer component bears chain-pendant carbonyl groups.

Y(C). The polyurethane polymer component bears both chain-pendant carbonyl functional groups and chain-pendant hydrazine (or hydrazone) functional groups in the same polymer molecules, and either the vinyl polymer component bears either hydrazine (or hydrazone) chain-pendant functional groups or chain-pendant carbonyl functional groups, or at least two vinyl polymers may be present at least one of which bears chain-pendant hydrazine (or hydrazone) functional groups and at least one of which bears chain-pendant carbonyl functional groups.

Optionally non-polyurethanic non-vinylic polyhydrazine (or polyhydrazone) and/or polycarbonyl compounds (i.e. compounds in which the hydrazine (or hydrazone) or carbonyl functional groups are not bound to polyurethane or vinyl polymers) and/or urethane oligomers having at least two hydrazine (or hydrazone) groups or at least two carbonyl groups may be included in the compositions of this embodiment Y of the invention.

It is preferred that in embodiment Y, the composition of the invention contains hydrazine (or hydrazone) functional groups and carbonyl functional groups in a ratio of 1:20 to 20:1, more preferably 1:10 to 10:1.

In embodiment Z of the present invention there is provided an aqueous selfcrosslinking coating composition comprising an aqueous dispersion comprising at least one polyurethane polymer and at least one vinyl polymer and and wherein either:

A. the at least one polyurethane polymer and the at least one vinyl polymer both bear chain-pendant carbonyl functional groups and the composition includes at least one non-polyurethanic, non-vinylic polyhydrazine (or polyhydrazone) compound and/or at least one urethane oligomer having at least two hydrazine (or hydrazone) functional groups; or B. the at least one polyurethane polymer and the at least one vinyl polymer both bear chain-pendant hydrazine (or hydrazone) functional groups and the composition includes at least one non-polyurethanic, non-vinylic polycarbonyl compound and/or at least one urethane oligomer having at least two carbonyl functional groups;

wherein said carbonyl functional groups and polyhydrazine (or polyhydrazone) compound(s) in A, or said hydrazine (or hydrazone) functional groups and polycarbonyl compound(s) in B, provide a selfcrosslinking reaction, in which both the polyurethane and vinyl polymers take part, via azomethine formation during and/or after film formation from the aqueous composition.

In embodiment Z, when the polymers contain chain-pendant carbonyl functional groups (alternative A) the ratio of hydrazine (or hydrazone) functional groups to carbonyl functional groups is preferably within the range of from 1:50 to 1.6:1, more preferably 1:20 to 0.9:1. When the polymers contain chain-pendant hydrazine (or hydrazone) functional groups (alternative B) the ratio of hydrazine (or hydrazone) functional groups to carbonyl functional groups is preferably within the range of from 50:1 to 1:1.6, more preferably 20:1 to 1:0.9.

As is well known, polyurethanes are generally made by reacting an organic polyisocyanate with an organic compound containing isocyanate-reactive groups, particularly a macro polyol, optionally with the inclusion of a low molecular weight organic polyol. A favoured route to their formation involves the formation of an isocyanate-terminated polyurethane prepolymer followed by chain extension with an active hydrogen-containing compound.

Carbonyl functionality may be introduced into the polyurethane backbone during the prepolymer formation and/or during the chain extension step. Hydrazine (or hydrazone) functionality may be introduced during the prepolymer formation and/or during the chain extension step. Optionally (but preferably) monomers bearing non-ionic or ionic dispersing or emulsifier groups (or groups that may be subsequently converted thereto) may be included in the prepolymer formation to provide the facility of self-dispersability in water of the polyurethane prepolymer and final chain extended polymer.

Preferably a polyurethane polymer bearing carbonyl functionality is the reaction product $P_1$ of:
I an isocyanate-terminated polyurethane prepolymer formed by reacting at least:
  (i) an organic polyisocyanate;
  (ii) a polymeric organic compound containing at least two isocyanate-reactive groups and having a weight average molecular weight in the range 400 to 6000;
  (iii) optionally an isocyanate-reactive and/or diisocyanate compound(s) bearing nonionic and/or ionic dispersing groups (or groups which may subsequently be converted to such dispersing groups); and
  (iv) optionally an organic polyol having a weight average molecular weight less than 400; and
II active hydrogen-containing chain extending material;
and wherein the carbonyl functionality in said polyurethane polymer is incorporated by virtue of
  (a) an isocyanate-reactive compound(s) providing carbonyl functionality being included as a reactant in the formation of I, and/or
  (b) the active hydrogen-containing chain extending material II being entirely or including a proportion of extending material providing carbonyl functionality pendant to the polyurethane polymer chain.

By an isocyanate-reactive compound in II(a) is meant a compound which will react with isocyanate groups and thereby become incorporated into (i.e. become part of) the polyurethane prepolymer chain. Examples of such compounds are carbonyl compounds with at least one and preferably at least two isocyanate-reactive groups, e.g dihydroxyketones such as dihydroxyacetone and the adduct obtained by a Michael-addition reaction of diacetoneacrylamide with a diamine or an alkanolamine; carbonyl compounds with only one isocyanate-reactive group can also be used if the urethane chain has been compensatingly branched with e.g. triols, triisocyanates and/or triamines.

Active hydrogen-containing chain extending compounds in II(b) which provide carbonyl functionality pendant to the polyurethane chain include carbonyl-functional diamino compounds such as the Michael-addition product of two moles di-acetoneacrylamide with one mole of a diamine.

Preferably a polyurethane polymer bearing hydrazine (or hydrazone) functionality is the reaction product $P_2$ of:
III an isocyanate-terminated polyurethane prepolymer formed by reacting at least:
  (v) an organic polyisocyanate;
  (vi) a polymeric organic compound containing at least two isocyanate-reactive groups and having a weight average molecular weight in the range 400 to 6000;
  (vii) optionally an isocyanate-reactive and/or diisocyanate compound(s) bearing nonionic and/or ionic dispersing groups (or groups which may subsequently be converted to such dispersing groups); and
  (viii) optionally an organic polyol having a weight average molecular weight less than 400; and
IV active hydrogen-containing chain extending material; and wherein the hydrazine (or hydrazone) functionality in said polyurethane polymer is incorporated by virtue of
  (c) an isocyanate-reactive compound(s) providing hydrazine (or hydrazone) functionality pendant to the polyurethane chain being included as a reactant in the formation of III, and/or
  (d) the active hydrogen-containing chain extending material IV being entirely or including a proportion of extending material providing hydrazine (or hydrazone) functionality pendant to the polyurethane chain.

By an isocyanate-reactive compound in IV(c) is meant a compound which will react with isocyanate groups and thereby become incorporated into (i.e. become part of) the polyurethane prepolymer chain. This isocyanatereactive compound (having at least one and preferably at least two isocyanate-reactive groups) is preferably a monoaldehyde or monoketone-blocked hydrazine compound, by which is meant a compound in which the hydrazine functionality has been blocked by reaction with a monoaldehyde or a monoketone (preferably of boiling point 30°-200° C., such as acetone or methyl ethyl ketone) to form a hydrazone structure. This expedient is employed because a hydrazine functionality will otherwise react during the prepolymer preparation and so be partially or even completely removed. The blocked hydrazine functionality is however not labile under anhydrous conditions and is moreover sufficiently stable at pH above 7 (preferably above 8) even in an aqueous medium, such alkaline conditions preferably being achieved by the presence of a volatile organic amine such as triethylamine. Consequently the chain extension step may be performed with the polyurethane in aqueous dispersion and the chain extending agent(s) in the aqueous phase, with the pH above 7 (preferably above 8), without the blocked hydrazine functionality becoming significantly affected or removed. Subsequent acidification as a result of evaporation of the neutralising agent during film formation will cause regeneration of the hydrazine functionality (which is then available for crosslinking purposes via azomethine formation) together with the monoaldehyde or monoketone blocking compound (which, if a volatile material such as acetone or methyl ethyl ketone, will also be removed by evaporation during film formation).

Examples of isocyanate-reactive monoaldehyde or monoketone-blocked hydrazine compounds in (c) include gamma hydroxy butyric hydrazide blocked with a ketone or aldehyde of boiling point 30° to 200° C. e.g.

HO CH$_2$ CH$_2$ CH$_2$ C(O) NHN=C (CH$_3$)$_2$ the diol of formula (OHCH$_2$CH$_2$)$_2$NCH$_2$CH$_2$C(O)NHN=C(CH$_3$)$_2$ formed by reacting ethyl acrylate with diethanolamine followed by reacting the resulting compound with hydrazine (to form the hydrazide) and blocking with acetone gamma hydroxy butyric hydrazide blocked with a ketone or aldehyde of boiling point 30° to 200° C. (e.g. acetone) selectively reacted with the 4-substituent isocyanate group of 2,4-toluene diisocyanate after which the reaction product has been selectively reacted with the amino group of diethanolamine, a typical compound of this type having the formula

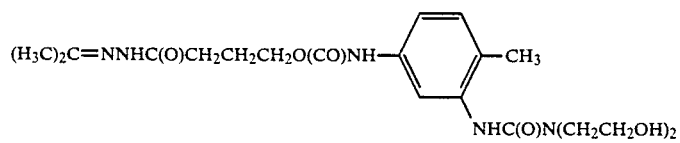

semicarbazido ethyl methacylate as described in Example 3 of U.S. Pat. No. 4,521,460 blocked with a ketone/aldehyde of boiling 30° to 200° C. and reacted with ethanolamine.

Active hydrogen-containing chain extending compounds in IV(d) which provide hydrazine (or hydrazone) functionality pendant to the polyurethane chain include diamino hydrazides of formula

as described in U.S. Pat. No. 4,598,121 (in which their preparation is fully described) where R$^1$ is an alkylene groups of 2 to 15 carbon atoms or a cycloalkylene or arylene group of 6 to 15 carbon atoms.

Such compounds may be prepared by reacting a diamine of formula H$_2$N—R$^1$—NH$_2$ with 0.2 to 2 moles of an acrylic acid derivative, preferably ethyl acrylate, and then reacting the product obtained with hydrazine.

Suitable diamines of the formula H$_2$N—R$^1$—NH$_2$ include aliphatic diamines of 2 to 15 carbon atoms and cycloaliphatic and aromatic diamines with 6 to 15 carbon atoms such as ethylenediamine, 1,4-butanediamine, 1,6-hexanediamine, 2-methyl-1,5-pentanediamine, 2,2,4-trimethyl-1,6-hexanediamine, 2,2,4- and 2,4,4-trimethyl-1,6-hexanediamine, bis(4-aminocyclohexyl) methane and di(aminomethyl)benzene. Isophoronediamine is a preferred diamine.

Preferably a polyurethane polymer bearing both pendant carbonyl functionality and pendant hydrazine (or hydrazone) functionality is the reaction product P$_3$ of:

V an isocyanate-terminated polyurethane prepolymer formed by reacting at least:
 (ix) an organic polyisocyanate;
 (x) a polymeric organic compound containing at least two isocyanate-reactive groups and having a weight average molecular weight in the range 400 to 6000;
 (xi) optionally an isocyanate-reactive and/or diisocyanate compound(s) bearing nonionic and/or ionic dispersing groups (or groups which may subsequently be converted to such dispersing groups); and
 (xii) optionally an organic polyol having a weight average molecular weight less than 400

VI active hydrogen-containing chain extending material;

and wherein the carbonyl and hydrazine (or hydrazone) functionalities in said polyurethane polymer are incorporated by virtue of (e) an isocyanate-reactive compound(s) providing hydrazine (or hydrazone) functionality pendant to the polyurethane chain being included as a reactant in the formation of V and the active hydrogen-containing chain extending material being entirely or including a proportion of extending material providing carbonyl functionality pendant to the polyurethane chain; or (f) an isocyanate-reactive compound(s) providing carbonyl functionality pendant to the polyurethane chain being included as a reactant in the formation of V and the active hydrogen-containing chain extending material being entirely or including a proportion of extending material providing hydrazine (or hydrazone) functionality pendant to the polyurethane chain; or (g) an isocyanate-reactive compound(s) providing hydrazine (or hydrazone) functionality pendant to the polyurethane chain and an isocyanate-reactive compound(s) providing carbonyl functionality pendant to the polyurethane chain being included as reactants in the formation of V; or (h) the active hydrogen-containing chain extending material VI being entirely or including a proportion of extending material providing hydrazine (or hydrazone) functionality pendant to the polyurethane chain and extending material providing carbonyl functionality pendant to the polyurethane chain.

The isocyanate-reactive compounds providing hydrazine (or hydrazone) functionality in VI(e) and VI(g) may be the same as those employed in IV(c) of $P_2$. The isocyanate-reactive compounds providing carbonyl functionality in VI(f) and VI(g) may be the same as those employed in II(a) of $P_1$. The active hydrogen-containing chain extending materials providing hydrazide (or hydrazone) functionality in VI(f) and VI(h) may be the same as those employed in IV(d) of $P_2$. The active hydrogen-compounds providing carbonyl functionality in VI(e) and VI(h) may be the same as those employed in II(b) of $P_1$.

The polyisocyanate used in making the prepolymers such as those of polyurethanes $P_1$, $P_2$ and $P_3$ may be an aliphatic, cycloaliphatic, araliphatic or aromatic polyisocyanate. Examples of suitable polyisocyanates include ethylene diisocyanate, 1,6-hexamethylene diisocyanate, isophorone diisocyanate, cyclohexane-1, 4- diisocyanate, 4,4'-dicyclohexylmethane diisocyanate, p-xylylene diisocyanate, tetramethylxylene diisocyanate, 1,4-phenylene diisocyanate, 2,4-toluene diisocyanate, 2,6-toluene, diisocyanate, 4,4'-diphenylmethane diisocyanate, 2,4'-diphenylmethane diisocyanate, polymethylene polyphenyl polyisocyanates and 1,5-naphthylene diisocyanate. Mixtures of polyisocyanates can be used and also polyisocyanates which have been modified by the introduction of urethane, allophanate, urea, biuret, carbodiimide, uretonimine or isocyanurate residues.

The polymeric organic compounds containing at least two isocyanate-reactive groups and having weight average molecular weights in the range 400–6000 which may be used in the preparation of prepolymers such as those of polyurethanes $P_1$, $P_2$ and $P_3$ are preferably polymeric organic polyols terminated by hydroxyl groups (although it would be possible to use polymeric compounds with other isocyanate-reactive groups, e.g. primary amino or carboxyl groups). The organic polyols particularly include diols and triols and mixtures thereof but higher functionality polyols may be used, for examples as minor components in admixture with diols. The polyols may be members of any of the chemical classes of polymeric polyols used or proposed to be used in polyurethane formulations. In particular the polyols may be polyesters, polyesteramides, polyethers, polythioethers, polycarbonates, polyacetals, polyolefins or polysiloxanes. Preferred polyol molecular weights are from 700 to 3000.

Polyester polyols which may be used include hydroxyl terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol or mixtures thereof with polycarboxylic acids, especially dicarboxylic acids or their ester-forming derivatives, for example succinic, glutaric and adipic acids or their dimethyl esters, phthalic anhydride or dimethyl terephthalate. Polyesters obtained by the polymerisation of lactones, for example caprolactone, in conjunction with a polyol, may also be used. Polyesteramides may be obtained by the inclusion of aminoalcohols such as ethanolamine in polyesterification mixtures.

Polyether polyols which may be used include products obtained by the polymerisation of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylolpropane, pentaerythritol or Bisphenol A. Especially useful polyethers include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran. Amine-terminated polyetherpolyols may also be used.

Polythioether polyols which may be used include products obtained by condensing thiodiglycol either alone or with other glycols, dicarboxylic acids, formaldehyde, aminoalcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Suitable polyolefin polyols include hydroxy-terminated butadiene homo- and copolymers.

Organic polyols having molecular weights below 400 which may optionally be used in the preparation of prepolymers such as those of polyurethanes $P_1$, $P_2$ or $P_3$ particularly include diols and triols and mixtures thereof but higher functionality polyols may be used. Examples of such lower molecular weight polyols include ethylene glycol, diethylene glycol, tetraethylene glycol, bis(hydroxyethyl) terephthalate, cyclohexane dimethanol, furan dimethanol, glycerol and the reaction products, up to molecular weight 399 of such polyols with propylene oxide and/or ethylene oxide.

As discussed supra it is optional (but in fact preferred) to provide the facility of self-dispersibility in water for the polyurethane prepolymers (such as those of polyurethanes $P_1$, $P_2$ or $P_3$), the final polyurethanes also being self-dispersable in water. This may be achieved (as for example in polyurethanes $P_1$, $P_2$ and $P_3$) by including an isocyanate-reactive and/or diisocyanate compound(s) bearing nonionic and/or ionic dispersing groups (or groups which may be subsequently converted to such dispersing groups) as reactants in the preparation of the prepolymer.

Typically, ionic dispersing groups are anionic salt groups, e.g. carboxylate salt groups. Such groups may e.g. be provided by employing as a reactant in the prepolymer formation (e.g. as $P_1I$(iii), $P_2III$(vii), or $P_3V$(xi)) an isocyanate-reative compound having at least one acid group and at least two hydroxyl groups. Examples of such compounds include carboxy group containing diols and triols, for example dihydroxy alkanoic acids of the formula:

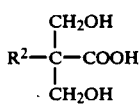

wherein $R^2$ is hydrogen or alkyl. The preferred carboxy containing diol is 2,2-dimethylolpropionic acid. If desired, the carboxy containing diol or triol may be incorporated into a polyester by reaction with a dicarboxylic acid before being incorporated into the prepolymer.

The conversion of any acid groups present in the prepolymer to anionic salt groups may be effected by neutralising the said acidic groups before, after (if in combination with nonionic stabilisation) or simultaneously with formation of an aqueous dispersion of the prepolymer.

Non-ionic dispersing groups are typically pendant polyoxyalkylene groups, particularly polyoxyethylene groups. Such groups may e.g. be provided by employing as a reactant in the prepolymer formation (e.g. as $P_1I(iii)$, $P_2III(vii)$, or $P_3V(xi)$) diols having pendent polyoxyethylene chains such as those described in the prior art, for example in U.S. Pat. No. 3,905,929. These diols, because of their function, may (for convenience) be termed dispersing diols. Particularly suitable dispersing diols may be obtained by reacting one mole of an organic diisocyanate in which the two isocyanate groups have different reactivities with approximately one mole of a polyethylene glycol mono ether and then reacting the adduct so obtained with approximately one mole of a dialkanolamine, for example diethanolamine.

Diisocyanates having groups of different reactivity which may be used in the preparation of the dispersing diols include 2,4-toluene diisocyanate, isophorone diisocyanate and 2,4′diphenylmethane diisocyanate. Polyethylene glycol monoethers which may be used include the reaction products of ethylene oxide with monohydric alcohols such as methanol, ethanol, tertiary butanol or benzyl alcohol or phenols such as phenol itself. The polyethylene glycol monoethers suitably have weight average molecular weights in the range 250 to 3000 and preferably in the range 500 to 2000.

If desired, the polyoxyethylene chains may contain units of other alkylene oxides in addition to the ethylene oxide units. Thus, polyoxyalkylene chains in which up to 60% of the alkylene oxide units are propylene oxide units, the remainder being ethylene oxide units, may be used.

The preparation of the dispersing diols may be achieved by adding the polyethylene glycol monoether to the diisocyanate at 20°–25° C., optionally in the presence of an inert solvent and a urethane catalyst, followed by addition of the dialkanolamine.

Non-ionic dispersing groups may also be provided by employing as a reactant in the prepolymer formation (e.g. as $P_1I(iii)$, $P_2III(vii)$, $P_3V(xi)$) diisocyanates having pendant polyoxyethylene chains such as those described in the prior art, for example in U.S. Pat. No. 3,920,598. These diisocyanates, because of their function, may be regarded as dispersing diisocyanates. Particularly suitable dispersing diisocyanates may be obtained by reacting two moles of an organic diisocyanate in which the two isocyanate groups have different reactivities with approximately one mole of a polyethylene glycol monoether, the initially formed urethane monoisocyanate then reacting at a higher temperature with the excess diisocyanate to form an allophanate diisocyanate having a pendent polyoxyethylene chain. Suitable diisocyanates and polyethylene glycol monoethers for use in preparing the dispersing diisocyanate have been mentioned above for the preparation of the dispersing diols.

The polyurethane prepolymer (and final polymer) may of course have a combination of ionic dispersing groups (such as those discussed above) and non-ionic dispersing groups (such as those discussed above) which may be introduced into the polyurethane by combining the expedients as exemplified above for the incorporation of such groups.

The pendant dispersing group content of the polyurethane (if present) may vary within wide limits but should be sufficient to provide the polyurethane with the required degree of water-dispersability. Typically the pendant dispersing group content will vary in the range 10 to 90 milliequivalents (more preferably 18 to 65 milliequivalents) of pendant anionic dispersing groups (particularly carboxylate groups) per 100 g polyurethane polymer and/or 0.5 to 25 g of pendant (lateral or terminal) nonionic dispersing groups (particularly polyethylene oxide groups) per 100g polyurethane polymer.

The isocyanate-terminated polyurethane prepolymer (e.g. $P_1I$, $P_2III$, or $P_3V$) may be prepared in conventional manner by reacting a stoichiometric excess of the organic polyisocyanate with the polymeric organic compound having at least two (terminal) isocyanate-reactive groups (usually hydroxyl) having a molecular weight in the range 400 to 6000 and the other required reactants under substantially anhydrous conditions at a temperature between about 30° C. and about 130° C. until reaction between the isocyanate groups and the isocyanate-reactive (usually hydroxyl) groups is substantially complete. During the production of the isocyanate-terminated prepolymer the reactants are generally used in proportions corresponding to a ratio of isocyanate groups to isocyanate-reactive (usually hydroxyl) groups of from about 1.1:1 to about 6:1, preferably from about 1.5:1 to 3:1.

If desired, catalysts such as dibutyltin dilaurate and stannous octoate may be used to assist prepolymer formation. A non-reactive organic solvent may optionally be added before or after prepolymer formation to control the viscosity. Suitable solvents which may be used include acetone, methylethylktone, dimethylformamide, ethylene carbonate, propylene carbonate, diglyme, N-methylpyrrolidone, ethyl acetate, ethylene and propylene glycol diacetates, alkyl ethers of ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidone, dimethyl sulphoxide and dialkyl ethers of glycol acetates or mixtures of N-methylpyrrolidone and methyl ethyl ketone.

The aqueous polyurethane dispersions may be prepared by dispersing the isocyanate-terminated polyurethane prepolymer (optionally carried in an organic solvent medium) in an aqueous medium (using e.g. surfactants, or more preferably by utilising the self-dispersability of the prepolymer if dispersing groups are present therein, although surfactants may still be employed if desired) and chain extending the prepolymer with active hydrogen-containing chain extender in the aqueous phase.

The prepolymer may be dispersed in water using techniques well known in the art. Preferably, the prepolymer is added to the water with agitation or, alternatively, water may be stirred into the prepolymer. The prepolymer may also be chain extended to form the polyurethane polymer while dissolved in organic solvent (usually acetone) followed by the addition of water to the polymer solution until water becomes the continuous phase and the subsequent removal of the solvent by distillation to form a purely aqueous dispersion (the well-known "acetone process").

Active hydrogen-containing chain extender material (of the type not used for providing chain pendant carbonyl or hydrazine (or hydrazone) functionality, which have already been discussed above) which may be reacted with the prepolymer is suitably a polyol, an amino-alcohol, a primary or secondary aliphatic, alicyclic, aromatic, araliphatic or heterocyclic diamine or polyamine, or hydrazine or a substituted hydrazine. Water-soluble chain extenders are preferred, and water itself may be effective.

Examples of such chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris (2-aminoethyl) amine, 3,3'-dinitrobenzidine, 4,4'-diaminodiphenylmethane, menthane diamine, m-xylene diamine, isophorone diamine, and adducts of diethylene triamine with acrylate or its hydrolyzed products. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulfonic acids such as adipic acid mono- or dihydrazide, oxalic acid dihydrazide, isophthalic acid dihydrazide, hydrazides made by reacting lactones with hydrazine such as gamma-hydroxylbutyric hydrazide, bis-semi-carbazide, bis-hydrazide carbonic esters of glycols such as any of the glycols mentioned above.

Where the chain extender is other than water, for example a polyol, polyamine or hydrazine, it may be added to the aqueous dispersion of prepolymer or, alternatively, it may already be present in the aqueous medium when the prepolymer is dispersed therein.

The chain extension can be conducted at elevated, reduced or ambient temperatures. Convenient temperatures are from about 5° C. to 95° C. or, more preferably, from about 10° to about 45° C.

The total amount of chain extender material(s) employed (besides water) should be approximately equivalent to the free-NCO groups in the prepolymer, the ratio of active hydrogens in the chain extender(s) to NCO groups in the prepolymer preferably being in the range from 0.7:1 to 2.0:1 more preferably 0.80:1 to 1.7:1. Of course, when water is employed as a chain extender, these ratios will not be applicable since the water, functioning both as chain extender and dispersing medium, will be present in a gross excess relative to the free-NCO groups.

Polyurethanes which incorporate chain-pendant carbonyl functionality preferably contain a proportion of carbonyl ( C=O) groups in the polymer within the range 3 to 140 milliequivalents more preferably 6 to 80 milliequivalents, per 100 g of polyurethane polymer. Polyurethanes which incorporate chain-pendant hydrazide (or hydrazone) functionality in the polymer preferably contain a proportion of hydrazine (—NHNH$_2$) groups (or corresponding hydrazone groups) in the polymer within the range 3 to 140 milliequivalents, more preferably 6 to 80 milliequivalents, per 100g of polyurethane polymer.

Preferably a vinyl polymer bearing chain-pendant carbonyl functionality is the product V$_1$ formed by the free-radical addition polymerisation of at least one carbonyl-containing monoethylenically unsaturated monomer with at least one other olefinically unsaturated monomer (i.e. monomer not providing carbonyl functionality).

Examples of carbonyl-containing monomers which may be mentioned include acrolein, methacrolein, diacetone-acrylamide, crotonaldehyde, 4-vinylbenzaldehyde, vinyl alkyl ketones of 4 to 7 carbon atoms such as vinyl methyl ketone, and acryloxy- and methacryloxy-alkyl propranols of formula

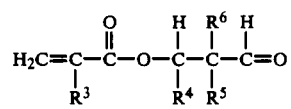

where $R^3$ is H or methyl, $R^4$ is H or alkyl of 1 to 3 carbon atoms, $R^5$ is alkyl of 1 to 3 carbon atoms, and $R^6$ is alkyl of 1 to 4 carbon atoms. Further examples include acrylamidopivalaldehyde, methacrylamidopivalaldehyde, 3-acrylamidomethyl-anisaldehyde, diacetone acrylate, acetonyl acrylate, diacetone methacrylate, acetoacetoxyethylmethacrylate, 2-hydroxypropylacrylate acetylacetate, and butanediolacrylate acetylacetate.

Examples of non-carbonyl-providing olefinically unsaturated monomers which may be mentioned include 1,3-butadiene, isoprene, styrene, divinyl benzene, acrylonitrile, methacrylonitrile, vinyl halides (such as vinyl chloride), vinyl esters (such as vinyl acetate, vinyl propionate and vinyl laurate), heretocyclic vinyl compounds, alkyl esters of monolefinically unsaturated dicarboxylic acids (such as di-n-butyl maleate and di-n-butyl fumarate) and, in particular, esters, of acrylic acid and methacrylic acid of formula $$CH_2=CR^7COOR^8$$

where $R^7$ is H or methyl and $R^8$ is alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate and n-propyl methacrylate.

The vinyl polymer bearing carbonyl functionality may be prepared by any suitable free-radical initiated polymerisation technique, a free-radical initiator and (usually) appropriate heating (e.g. 40° to 90° C.) being employed. The polymerisation is normally effected in an aqueous medium, and in particular aqueous emulsion polymerisation is used to prepare the polymer with conventional dispersants being used (e.g. anionic and/or non-ionic emulsifiers such as Na salts of dialkylsulphosuccinates, Na salts of sulphated oils, Na salts of alkyl sulphonic acids, Na, K and ammonium alkyl sulphates, alkali metal salts of sulphonic acids, C$_{12-24}$ fatty alcohols, ethoxylated fatty acids and/or fatty amides, and Na salts of fatty acids such as Na stearate and Na oleate; the amount used is usually 0.1 to 3% by weight on the weight of total monomer(s) charged) and conventional free radical initiators being used (e.g. hydrogen peroxide, t-butylhydroperoxide, persulphates such as NH$_4$ persulphate K persulphate and Na persulphate; redox system may be used; the amount is generally 0.05 to 3% based on the weight of total monomers charged).

The proportion of carbonyl functional groups in the polymer V$_1$ is preferably 3 to 200 milliequivalents per 100 g polymer (more preferably 6 to 100 milliequievalents per 100 g polymer).

The carbonyl-containing vinyl polymer may in addition contain, as copolymerized units, small amounts (mostly from 0.5 to 10% by weight) of α,β-monoolefinically unsaturated monocarboxylic acids and/or dicarboxylic acids, mostly of 3 to 6 carbon atoms, and/or of their N-unsubstituted or N-substituted amides, especially acrylic acid, methacrylic acid, beta-carboxyethylacrylate, fumaric acid, itaconic acid, acrylamide, methacrylamide, N-methylacrylamide, N-methylolacrylamide, N-n-butoxymethylmethacrylamide, maleimide and maleic acid diamide, and also monoolefinically unsaturated sulphonic acids especially vinylsulphonic acid and methacrylamidopropanesulphonic acid.

Preferably a vinyl polymer bearing chain-pendant hydrazine (or hydrazone) functional groups is the product $V_2$ formed by reacting at least:

VII a free radical addition polymer formed by polymerizing at least one olefinically unsaturated monomer providing chain-pendant hydrazinolysable groups; and VIII a hydrazine-yielding agent, whereby at least a proportion of the chain-pendant hydrazinolysable groups in VII are converted to hydrazine functional groups.

Suitable groups for hydrazinolysis are e.g. acid, acid halide and (especially) ester groups. The polymer VII may be a homopolymer but is more usually a copolymer of at least two monomers. Examples of monomers providing chain-pendant hydrazinolysable groups include crotonic acid, α-chloroacrylic acid and especially acrylic acid, and acid chlorides or esters thereof, and also methacrylic acid and acid chlorides or esters thereof. There are advantageously used acrylic acid esters of alcohols of low molecular weight, such as methyl, ethyl, propyl, isopropyl, n-butyl or secondary butyl esters. As further comonomers (not providing hydrazinolysable groups) which can be used to form VII there may be used, for example vinyl halides such as vinyl chloride, vinyl fluoride or vinylidene chloride; vinyl-aryl-compounds such as styrene or substituted styrenes. There may also be used polymerizable olefines, such as isobutylene, butadiene or 2-chlorobutadiene, or heterocyclic compounds containing at least one vinyl group such as the various vinyl-pyridines.

It is also possible to employ as VII homopolymers of (meth)acrylic acid esters, where only a proportion of the ester groups in the polymer undergo conversion during the reaction with the agent yielding hydrazine. Such homopolymers are advantageously derived from acrylic or methacrylic acid esters of alcohols of low molecular weight, for example, from (meth)acrylic acid methyl ester, ethyl ester, propyl ester, isopropyl ester, n-butyl ester or secondary butyl ester.

Typically, as described in U.S. Pat. No. 4,594,383, VII may be a copolymer of at least one monomer selected from lower alkyl acrylates and lower alkyl methacrylates (1 to 3 atoms in the alkyl group, preferably 1 or 2) and at least one monomer selected from higher alkyl acrylates and higher alkyl methacrylatess (at least 4 carbon atoms in the alkyl group, preferably 4 to 12 carbon atoms). Example of the "lower" (meth)acrylates are methyl acrylate and methyl methacrylate; examples of the "higher" alkyl (meth)acrylates are n-butyl, n-pentyl, n-hexyl, and n-lauryl acrylates and methacrylates and their branched chained isomers.

The hydrazine (or hydrazone) content of the polymer $V_2$ is typically from 5 to 300 milliequivalents per 100g polymer, preferably 10 to 200 milliequivalents per 100g polymer. The level of hydrazine groups may if desired be sufficient to render the polymer water soluble.

As agents VIII yielding hydrazine there may be particularly mentioned hydrazine itself and hydrazine monohydrate. The relative proportions of VII and VIII which are to be used will depend on the proportion of hydrazine functional groups which is required.

When a hydrazone-containing vinyl polymer is required, the hydrazine groups may be converted to hydrazone groups by reacting $V_2$ with a saturated monoketone or monaldehyde containing at least two carbon atoms and preferably of boiling point 30° to 200° C. Examples of such compounds include, for example, aliphatic ketones or aldehydes, such as acetone, ethyl methyl ketone, diisopropyl ketone, isobutyl methyl ketone, di-n-butyl ketone, dodecylmethyl ketone, octadecyl isobutyl ketone, acetaldehyde or propionaldehyde, or cycloalipatic ketones such as cyclohexanone, or camphor, or aryl alkyl ketones, such as acetophenone, or compounds such as benzaldehyde or furfuraldehyde, or finally amino-ketones or amino-aldehydes, such as para-acetylamino-benzaldehyde, diacetoneamine, N-methyl-diacetone-amine, aminomethylphenyl ketone, or oxy-ketones and oxy-aldehydes, such as glucose, fructose, ortho-oxyacetophenone, salicylaldehyde or halogenated aldehydes and ketones such as chloral or chlorinated acetones.

Such hydrazine (o hydrazone) functionalised vinyl polymers may be made by methods in themselves known by polymerization in solution, in bulk or in emulsion, and advantageously under the action of a polymerization catalyst and any of the usual regulating or activating additions.

The other reaction conditions, such as temperature, duration of the reaction and the use of solvents, are suitably chosen for each particular case. They depend largely on the ease with which the reaction can be carried out. Those skilled in the art will easily be able to determine the most favourable conditions by preliminary tests. In general it is desirable to use as mild conditions as possible, because the reaction products containing hydrazine groups can easily undergo further reaction with cross-linking. For example, VII may be made by solution polymerisation using free-radical yielding initiators such as azobisisobutyronitrile. Hydrazinolysis may be effected by dissolving or dispersing VII in a water-miscible alcohol (e.g. methanol, ethanol) or a water/alcohol mixture (if such an alcohol is used as solvent to prepare VII, the resulting polymer solution may be used directly) followed by the addition of hydrazine or hydrazine hydrate, (e.g. at 50°-80° C.).

Both carbonyl-bearing and hydrazine (or hydrazone)-bearing vinyl polymers for use in the invention preferably have weight average molecular weight within the range 500 to 5,000,000 (more usually 1000 to 1,000,000).

The polyurethane polymer(s) and vinyl polymer(s) in embodiments Y and Z of the composition of the invention may be brought together by any suitable technique. For example, an aqueous dispersion of the polyurethane and an aqueous solution or dispersion of the vinyl polymer (or an organic-solvent solution in a water-miscible solvent) may merely be mixed together with agitation. Another possibility, in the case of employing only vinyl polymer(s) with chain-pendant carbonyl groups, is to perform the preparation of the vinyl polymer in the presence of polyurethane polymer (provided undesirable premature cross-linking is not incurred). In one variant of this method the aqueous-based composition containing vinyl polymer(s) may be formed by subjecting one or more vinyl monomers to free radical polymerisation conditions in the presence of a dispersion of an already chain-extended polyurethane polymer (preferably of the anionic or nonionic water-dispersible type) using conventional techniques. Thus free radical initiators may be added to a mixture of polyurethane dispersion and vinyl monomer, or, alternatively monomer may be added gradually to polyurethane dispersion containing initiator.

In another variant of this method (preferably performed to incorporate an anionic water-dispersible polyurethane with vinyl polymer), the following steps are employed:

forming a solution of a (preferably anionic water-dispersible) isocyanate terminated prepolymer in at least one vinyl monomer.
dispersing the solution in an aqueous medium
chain extending the polyurethane, and either
(a) adding further vinyl monomer, and initiating polymerisation of the vinyl monomer, or
(b) initiating polymerisation of the vinyl monomer and adding further vinyl monomer during polymerisation.

Suitable free radical initiators for such variants include mixtures partitioning between the aqueous and organic phases, for example a combination of t-butylhydroperoxide, isoascorbic acid and Fe.EDTA.

The weight ratio of polyurethane polymer(s) to vinyl polymer(s) in the composition is suitably in range 9:1 to 1:9, more preferably 5:1 to 1:5.

Where the compositions of the invention incorporate non-polyurethanic non-vinylic polycarbonyl compound(s) and/or oligomeric urethane polycarbonyl compounds, the level of such polycarbonyl compound(s) is preferably that to provide a range of 0.02 to 1.6 moles carbonyl groups per mole of hydrazine (or hydrazone) groups present, more preferably 0.05 to 0.9 moles per mole. Examples of suitable polycarbonyl compounds are di-or poly-ketones, di-or poly-aldehydes, and aldehyde-ketones such as glyoxal, 2,5-hexanedione, glutaric dialdehyde, succinic dialdehyde, acetyl acetone, acetonyl acetone, and acetone dicarboxylic acid ester.

Where the compositions of the invention incorporate non-polyurethanic non-vinylic polyhydrazine (or polyhydrazone) compound(s) and/or oligomeric urethane polyhydrazine (or polyhydrazone) compound(s), the level of such polyhydrazine (or polyhydrazone) compounds(s) is preferably that to provide a range of 0.02 to 1.6 moles hydrazine (or hydrazone) groups present per mole of carbonyl groups present, more preferably 0.05 to 0.9 moles per mole. Examples of such suitable polyhydrazine (or polyhydrazone) compounds include dicarboxylic acid bishydrazides of formula $$H_2N-NH-C(O)-R^9-C(O)-NH-NH_2$$

and dicarboxylic acid bis-hydrazones of formula.

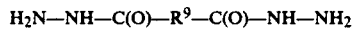

wherein $R^9$ is a covalent bond or a polyalkylene (preferably polymethylene) or alicyclic group having from 1 to 34 carbon atoms or a divalent aromatic ring, and $R^{10}$ and $R^{11}$ are selected from the group consisting of H and ($C_1$ to $C_6$) alkyl and alicyclic groups. Examples of suitable dihydrazides include oxalic acid dihydrazide, malonic acid dihydrazide, succinic acid dihydrazide, glutaric acid dihydrazide, adipic acid dihydrazide cyclohexane dicarboxylic acid bis-hydrazide, azelaic acid bis-hydrazide, and sebacic acid dihydrazide. Other suitable compounds are polyhydrazides of carbonic acid, e.g. carbonic acid dihydrazide and compounds of the general formula

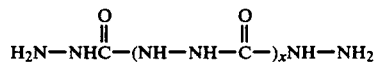

where x is from 1 to 5, preferably from 1 to 3, and bis-semicarbazides, especially aliphatic and cycloaliphatic bis-semicarbazides of the general formula.

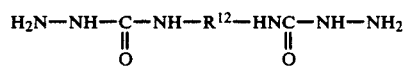

where —$R^{12}$— is a straight or branched aliphatic radical of 2 to 7 carbon atoms or a carbocyclic radical of 6 to 8 carbon atoms, e.g. o-, m- or p-phenylene or toluylene or cyclohexylidene or methylcyclohexylidene. Polyhydrazides of aromatic polycarboxylic acids, e.g. the dihydrazides of phthalic acid, terephthalic acid and isophthalic acid, and the dihydrazides, the trihydrazide and the tetrahydrazide of pyromellitic acid, are other examples. Examples of other suitable compounds are trihydrazides, e.g. nitrilotriacetic acid trihydrazide, and tetrahydrazides, e.g. ethylenediaminetetraacetic acid tetrahydrazide. Further possible hydrazides are dihydrazino- and trihydrazino-triazine, thiocarbohydrazide and N,N'-diaminoguanidine, as well as hydrazinopyridine derivatives of the type of 2-hydrazino-pyridine-5-carboxylic acid hydrazide, 3-chloro-2-hydrazinopyridine-5-carboxylic acid hydrazide, 6-chloro-2-hydrazinopyridine-4-carboxylic acid hydrazide and 2,5-dihydrazinopyridine-4-carboxylic acid, and bis-thiosemicarbazides as well as bis-hydrazines of alkylene-bis-acrylamides, dihydrazinoalkanes and dihydrazines of aromatic hydrocarbons, e.g. 1,4-dihydrazinobenzene, 1,3-dihydrazinobenzene and 2,3-dihydrazinonaphthalene.

The compositions of the invention may optionally contain 0.0002 to 0.02 mole per mole of hydrazine (or hydrazone) groups of a heavy metal ion. This may be added in the form of suitable water-soluble metal salts, particularly chlorides, sulphates, and acetates. Suitable heavy metal water-soluble salts are, in particular, those of Cu, Zn, Fe, Cr, Mn, Pb, V, Co and Ni.

The aqueous composition of the invention may be advantageously employed as coating compositions, (e.g. protective or adhesive coating compositions) for which purpose they may be further diluted with water and/or organic solvents, or they may be supplied in more concentrated form by evaporation of water and/or organic components of the liquid medium. As coating compositions, they may be applied to any substrate including wood, metals, glass, cloth, leather, paper, plastics, foam and the like, by any conventional method including brushing, dipping, flow coating, spraying, and the like. The compositions may contain other conventional ingredients including organic solvents, pigments, dyes, emulsifiers, surfactants, thickeners, heat stabilizers, levelling agents, anti-cratering agents, fillers, sedimentation inhibitors, UV absorbers, antioxidants and the like introduced at any stage of the production process or subsequently. It is possible to include an amount of an antimony oxide in the dispersions to enhance the fire retardant properties. The dispersions may also be used as adhesives for materials such as polypropylene, polyester, polyurethane, leather and the like or as binding agents for various particulate materials.

The dispersions suitably have solids contents of from about 20 to 60% by weight, preferably from about 25 to 45% by weight.

If desired, the compositions of the present invention may include other polymer dispersions (i.e. polymers other than polyurethane polymer bearing hydrazine (or hydrazone) and/or carbonyl functional groups and vinyl polymers bearing hydrazine (or hydrazone) and/or carbonyl functional groups), for example polyvinyl acetate, polyethylene, polystyrene, polybutadiene, polyvinyl chloride, polyacrylate and other homopolymer and copolymer dispersions. These can sometimes be prepared in-situ (e.g. by polymerisation of the monomers in the presence of the polyurethane polymer or prepolymer).

The present invention is now illustrated by the following examples. Unless otherwise specified, all parts and percentages are on a weight basis.

EXAMPLE 1

This example describes the preparation of an aqueous-based selfcrosslinkable coating composition according to embodiment X of the invention containing a polyurethane polymer having pendant carbonyl-functional groups, a non-polyurethanic non-vinylic bishydrazine compound, and an acrylic copolymer.

A urethane prepolymer with chain-pendant carbonyl-functional groups and with an acrylic monomer as solvent was prepared using the following recipe:

|  | parts |
| --- | --- |
| Polyol: Terathane - 2000* | 468.41 |
| Terathane - 2900** | 137.84 |
| dimethylolpropionic acid | 81.25 |
| dihydroxyacetone | 37.50 |
| n-butyl acrylate | 313.85 |
| inhibitor: Topanol 0 | 0.63 |
| catalyst: Ferro 820 (tin-based) | 0.15 |
| isophorone diisocyanate | 525.00 |

*polytetrahydrofuran polyol of mol. wt. 1978
**polytetrahydrofuran polyol of mol. wt. aprox 2900)

The system was mixed and heated to 80° C. for three hours until the level of NCO groups dropped to 5.20%. The prepolymer was neutralized with 56.38 parts triethylamine and dispersed in 2777.9 parts of water. Dispersion was completed in 60 minutes. After dispersion 38.43 parts of hydrazine monohydrate was added, causing chain extension to form the polyurethane polymer.

The resulting dispersion had a pH of 7.63 a Brookfield viscosity of 21 cps and a solids content of 28%.

An acrylic polymer was formed in the presence of the polyurethane polymer using the following process.

A 2 liter reactor (under nitrogen) was charged with 1134.34 parts of the polyurethane dispersion (containing n-butyl acrylate) and an additional 310.87 parts water. To this dispersion was added 10% of the monomer feed listed below and 9 parts of a 2% iso-ascorbic acid solution in water (neutralized with ammonia). The reactor temperature was raised to 75° C. At this temperature the remaining part of the monomer feed was fed in over 60 minutes. Together with the monomer feed 81 parts of a 2% iso-ascorbic acid solution (neutralized) was also added, this being fed in over 75 minutes. When the iso-ascorbic acid feed had been completed, the reaction medium was kept at 78° C. for one hour before cooling.

|  |  | parts |
| --- | --- | --- |
| Monomer feed: | tert. butylhydroperoxide | 1.50 |
|  | methyl methacrylate | 201.30 |
|  | butyl methacrylate | 17.70 |
|  | allyl methacrylate | 6.00 |
|  | dimethyl ethanolamine | 0.30 |

The resulting dispersion had a polyurethane: acrylic polymer ratio of 1:1, a pH of 7.94, a Brookfield viscosity of 15 cps and a 35% solids content.

When 50 parts of this dispersion were treated with 1.85 parts of a 3.6% solution of adipic acid dihydrazide in water (pH=8.5), films formed from the resulting composition (now being according to the invention) on glass-plates exhibited an increase in ethanol double-rubs resistance of from 50 to 200 double-rubs and an increase of Konig hardness of from 108 sec. to 124 sec., the lower values being those obtained using the same tests (under the same conditions) on films formed from the dispersion without any dihydrazide therein. (The double rub test assesses the solvent resistance of a film and is effected by rubbing the film with a rag soaked with the solvent until the substrate is showing through, the result being quoted as the number of double rubs to effect this.)

EXAMPLE 2

This example describes the preparation of an aqueous-based selfcrosslinking coating composition according to embodiment X of the invention containing a polyurethane polymer having chain-pendant carbonyl-functional groups and a non-polyurethanic nonvinylic bishydrazine compound.

A carbonyl-functional diol was prepared from the following mixture of compounds:

|  | parts |
| --- | --- |
| diethanolamine | 37.24 |
| diacetoneacrylamide | 60.00 |
| N-methylpyrrolidone | 60.00 |

This mixture was heated for 7 hours at 85° C. in a nitrogen atmosphere to give a solution of the following compound

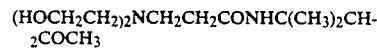

in N-methylpyrrolidone (NMP) which was used (after cooling) for urethane prepolymer synthesis without any purification.

A urethane prepolymer with chain-pendant carbonyl functional groups, using methyl proxitol acetate and N-methylpyrrolidone as solvents, was prepared using the following recipe:

|  | parts |
| --- | --- |
| Polyol: Terathane 2000 | 314.75 |
| carbonyl compound in NMP (as above) | 58.21 |
| methyl proxitol acetate | 127.80 |
| isophorone diisocyanate | 216.25 |
| catalyst: Ferro 820 (tin-based) | 0.14 |

-continued

| | parts |
|---|---|
| dimethylol propionic acid | 33.00 |

The polyol, the carbonyl compound, the solvent and the isocyanate were mixed and half the amount of the catalyst was added. The system was heated for 1 hour at 77° C. and then the dimethylolpropionic acid and the remaining part of the catalyst were added. The system was heated for at least 1 hour at 92° C. until the level of NCO groups dropped to 4.17%. The resulting prepolymer was neutralized with 24.93 parts triethylamine and dispersed in a reactor containing a solution of 2.49 parts triethylamine and 18.00 parts Antarox CO 630 (non-ionic surfactant) in 929.57 parts water. Dispersing the urethane prepolymer took 1 hour. Simultaneously with the neutralized prepolymer dispersion, a solution of 17.72 parts hydrazine monohydrate in 55.57 parts water was fed to the reactor, causing chain extension to form the polyurethane polymer.

The resulting dispersion had a pH of 8.85, a Brookfield viscosity of 570 cps, and a solids content of 35%.

When 100 parts of this polyurethane dispersion were treated with 3.34 parts of a 9.5% solution of adipic acid dihydrazide in water (pH=8.5), films formed from the resulting composition (now being according to the invention) on glass-plates exhibited an increase in ethanol double-rubs resistance of from 17 to at least 200 double-rubs, an increase of Konig hardness of from 63 sec. to 73 sec., and an increase in 100% Modulus of from 30.5N/mm$^2$ to 35.6N/mm$^2$, the lower values being those obtained using the same tests (under the same conditions) on films formed from the dispersion without any dihydrazide therein.

EXAMPLE 3

This example describes the preparation of an aqueous-based selfcrosslinking coating composition according to embodiment X of the invention containing a polyurethane polymer having chain-pendant hydrazone functional groups and a non-polyurethanic non-vinylic di-aldehyde compound.

A hydrazone-functional diol was prepared from the following compounds:

| | parts |
|---|---|
| diethanolamine | 365.7 |
| ethyl acrylate | 383.6 |
| hydrazine monohydrate | 182.7 |
| acetone | 508.1 |

The diethamolamine was first mixed with the ethyl acrylate and the mixture was heated to 40° C.; at this temperature the exothermic reaction caused the mixture to further increase in temperature to 75° C. After this the temperature dropped and the mixture was kept at 45° C. for 2 hours. After cooling to room temperature the hydrazine monohydrate was added and the mixture was kept for 5 hours at 40° C. At room temperature, the acetone was added and the mixture was heated for 4 hours at 68° C. The surplus of acetone and the formed water and ethanol were then distilled of under vacuum at 70° C. The remaining liquid crystallized at room temperature to yield the following compound:

(HOCH$_2$CH$_2$)$_2$NCH$_2$CH$_2$CONHN=C(CH$_3$)$_2$

This hydrazone-functional diol was used for urethane prepolymer synthesis without any further purification.

A urethane prepolymer with chain-pendant hydrazone-functional groups, using methyl proxitol acetate and N-methylpyrrolidone as solvents, was prepared using the following recipe:

| | parts |
|---|---|
| polyol: Terathane 2000 | 306.95 |
| hydrazone compound (as above) | 36.00 |
| N-methylpyrrolidone | 9.00 |
| methyl proxitol acetate | 141.00 |
| isophorone diisocyanate | 224.05 |
| catalyst: Ferro 820 (tin-based) | 0.14 |
| dimethylol propionic acid | 33.00 |

The polyol, the hydrazone compound, the solvent and the isocyanate were mixed and half the amount of the catalyst was added. The system was heated for 1 hour at 77° C. and then the dimethylol propionic acid and the remaining part of the catalyst were added. The system was heated for at least 1 hour at 90° C. until the level of NCO groups dropped to 4.96%.

The resulting prepolymer was neutralized with 24.92 parts triethylamine and dispersed in a reactor containing a solution of 2.49 parts triethylamine in 889.21 parts water. Dispersing the urethane prepolymer took 1 hour. Simultaneously with the neutralized prepolymer dispersion, a solution of 17.72 parts hydrazine monohydrate in 65.52 parts water was fed to the reactor, causing chain extension to form the polyurethane polymer.

The resulting dispersion had a pH of 8.0, a Brookfield viscosity of 160 cps, and a solids content of 35%.

When 100 parts of this polyurethane dispersion were treated with 8.95 parts of a 5% solution of glutaric dialdehyde in water, films formed from the resulting composition (now being according to the invention) on glass-plates exhibited an increase in ethanol double-rub resistance of from 130 to at least 200 double-rubs, an increase in N-methylpyrrolidone double-rub resistance of from 80 to at least 200 double-rubs, and an increase in 100% Modulus of from 38.5N/mm$^2$ to 41.9N/mm$^2$, the lower values being those obtained using the same tests (under the same conditions) on films formed from the dispersion without any dialdehyde therein.

EXAMPLE 4

This example describes the preparation of an aqueous-based selfcrosslinkable coating composition according to embodiment X of the invention containing a polyurethane polymer having pendant carbonyl-functional groups, a non-polyurethanic non-vinylic bishydrazine compound, and an acrylic copolymer.

A carbonyl-functional diol was prepared from the following mixture of compounds:

| | parts |
|---|---|
| diethanolamine | 37.24 |
| diacetoneacrylamide | 60.00 |
| N-methylpyrrolidone | 60.00 |

This mixture was heated for 7 hours at 85° C. in a nitrogen atmosphere to give a solution of the following compound:

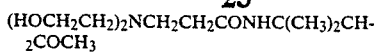(HOCH$_2$CH$_2$)$_2$NCH$_2$CH$_2$CONHC(CH$_3$)$_2$CH$_2$COCH$_3$ in N-methylpyrrolidone (NMP) which was used (after cooling) for urethane prepolymer synthesis without any purification.

A urethane prepolymer with chain-pendant carbonyl-functional groups and with an acrylic monomer as solvent was prepared using the following recipe:

|  | parts |
| --- | --- |
| polyol: Terathane 2000 | 232.68 |
| carbonyl compound in NMP (as above) | 62.06 |
| isophorone diisocyanate | 182.29 |
| n-butyl acrylate | 96.28 |
| inhibitor: Ionol CP | 0.29 |
| catalyst: Ferro 820 (tin based) | 0.11 |
| dimethylol propionic acid | 26.39 |

The polyol, the carbonyl compound, the inhibitor together with the solvent and the isocyanate were mixed and half the amount of the catalyst was added. The system was heated for 1 hour at 77° C. and then the dimethylol propionic acid and the remaining part of the catalyst were added. The system was heated for at least 1 hour at 86° C. until the level of NCO groups dropped to 5.01%.

The prepolymer was neutralized with 19.93 parts triethylamine and dispersed in a reactor containing a solution of 0.5 parts triethylamine in 1301.55 parts water. Dispersing the urethane prepolymer took 45 minutes. After dispersion a solution of 17.06 parts hydrazine monohydrate in 25 parts water was added, causing chain extension to form the polyurethane polymer.

The dispersion had a pH of 8.1, a Brookfield viscosity of 7.5 cps, and a solids content of 25%.

An acrylic polymer was formed in the presence of the polyurethane polymer using the following process.

A 2 liter reactor (under nitrogen) was charged with 700.00 parts of the polyurethane dispersion (as prepared above), and a mixture of 1.6 parts tertiary butylhydroperoxide, 0.03 parts ammonia (12.5%) and 242.22 parts water was added. To this dispersion was added 7.7 parts of a 1.0% iso-ascorbic acid solution in water (neutralized with ammonia). The reactor temperature was raised to 85° C. At this temperature the monomer feed listed below was fed in over 90 minutes. Together with the monomer feed 69.3 parts of a 1.0% iso-ascorbic acid solution (neutralized) was also added, this being fed in over 100 minutes. When the iso-ascorbic acid feed had been completed, the reaction medium was kept at 90° C. for 30 minutes before cooling.

|  |  | parts |
| --- | --- | --- |
| Monomer feed: | n-butyl acrylate | 29.85 |
|  | n-butyl methacrylate | 110.77 |
|  | methyl methacrylate | 81.74 |
|  | N,N-dimethylethanolamine | 0.26 |

The resulting dispersion had a polyurethane: acrylic polymer ratio of 4:6, a pH of 9.3, a Brookfield viscosity of 16 cps and a 34.3% solids content.

When 100 parts of this dispersion were treated with 8.35 parts of a 5% solution of adipic acid dihydrazide in water (pH=8.5), films formed from the resulting composition (now being according to the invention) exhibited an increase in the 100% Modulus of from 30.6N/mm$^2$ to 35.6N/mm$^2$, the lower value being that obtained using the same test (under the same conditions) on films formed from the dispersion without any dihydrazide therein.

EXAMPLE 5

This example describes the preparation of an aqueous-based selfcrosslinking coating composition according to embodiment X of the invention containing a polyurethane polymer having chain pendant hydrazine functional groups and a non-polyurethanic non-vinylic dialdehyde compound.

An active hydrogen-containing chain-extending compound for use in this example was prepared according to the following procedure. In a nitrogen atmosphere at 45° C., 232.71 parts of ethyl acrylate were added in 2.5 hours to 400.00 parts of isophorone diamine (while stirring). When all of the ethyl acrylate had been added, the temperature was maintained at 45° C. for another 5 hours. The temperature was then raised to 50° C. and 116.35 parts of hydrazine monohydrate were added to the mixture over a period of 30 minutes. The temperature was then raised to 65° C. and kept there for 5 hours. The prepared mixture, which was a solution of the following compound

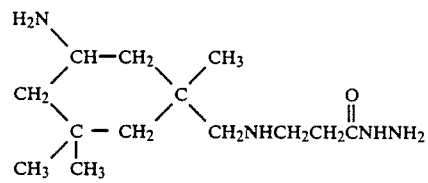

in a 1:1 water/ethanol mixture, was used (after cooling) as chain extending material in urethane synthesis without any purification.

A urethane prepolymer with N-methylpyrrolidone as solvent was prepared using the following recipe.

|  | parts |
| --- | --- |
| polyol: Terathane 2000 | 750.72 |
| isophorone diisocyanate | 383.28 |
| dimethylol propionic acid | 66.00 |
| N-methylpyrrolidone | 299.82 |
| catalyst: Ferro 820 (tin based) | 0.18 |

The polyol, diisocyanate, dimethylol propionic acid and half the amount of N-methylpyrrolidone were mixed and subsequently half of the amount of catalyst was added. The system was heated for 1 hour at 90° C. before the second half of the catalyst was added. After another hour at 90° C., the second half of the N-methylpyrrolidone was added. The level of NCO groups had dropped to 4.75%.

The prepolymer was neutralised with 49.80 parts of triethylamine and dispersed in a solution of 3.87 parts triethylamine in 1902.46 parts water contained in a reactor. Dispersing the urethane prepolymer took 1.5 hours. Simultaneously with the neutralized prepolymer dispersion, a solution of 229.35 parts of the prepared chain extending material (as described above) in 271.22 parts of water was fed to the reactor, causing chain extension to form the polyurethane polymer having chain-pendant hydrazine groups.

The resulting dispersion had a pH of 10.0, a Brookfield viscosity of 2.04 cps and a solids content of 35%.

When 100 parts of this polyurethane dispersion were treated with 10.0 parts of 5% solution of glutaric dialdehyde in water, films formed from the resulting composition (now being according to the invention) on glass-plates exhibited an increase in ethanol double rub resistance of from 86 to at least 200 double-rubs and an increase in 100% modulus of from 33.0N/mm² to 39.4N/mm², the lower values being those obtained using the same tests (under the same conditions) on films formed from the dispersion without any dialdehyde therein.

EXAMPLE 6

This example describes the preparation of an aqueous-based selfcrosslinking coating composition according to embodiment X of the invention containing a polyurethane polymer having chain-pendant hydrazine functional groups and a non-polyurethanic non-vinylic dialdehyde compound.

The same reactive hydrogen-containing chain extending compound employed in Example 5 was prepared according to the procedure described in Example 5.

A urethane prepolymer with N-methylpyrrolidone as solvent was prepared using the following recipe:

|  | parts |
| --- | --- |
| polyol: UCN 1818* | 750.72 |
| isophorone diisocyanate | 383.28 |
| dimethyl propionic acid | 66.00 |
| N-methylpyrrolidone | 299.82 |
| catalayst: Ferro 820 (tin based) | 0.18 |

*polyester polyol of mol. wt. 2029

The polyol, diisocyanate, dimethylol propionic acid and half the amount of N-methylpyrrolidone were mixed and subsequently half the amount of catalyst was added. The system was heated for 1 hour at 90° C. before the second half of the catalyst was added. After another hour at 90° C., the second half of the N-methyl pyrrolidone was added. The level of NCO groups had dropped to 4.82%. The prepolymer was neutralised with 49.80 parts of triethylamine and dispersed in a solution of 3.87 parts triethylamine in 1902.46 parts water contained in a reactor. Dispersing the urethane prepolymer took 1.5 hours. Simultaneously with the neutralized prepolymer dispersion, a solution of 231.62 parts of the above-mentioned chain extending material in 271.22 parts of water was fed to the reactor, causing chain extension to form the polyurethane polymer having chain-pendant hydrazine groups.

The resulting dispersion had a pH of 10.0, a Brookfield viscosity of 43.9 cps and a solids content of 35%.

When 100 parts of this polyurethane dispersion were treated with 10.0 parts of a 5% solution of glutaric dialdehyde in water, films formed from the resulting compositions (now being according to the invention) on glass-plates exhibited an increase in ethanol double rub resistance of from 100 to at least 200 double-rubs and an increase in 100% modulus of from 40.0N/mm² to 45.1N/mm², the lower values being those obtained using the same tests (under the same conditions) on films formed from the dispersion without any dialdehyde therein.

EXAMPLE 7

This example describes the preparation of an aqueous-based selfcrosslinking coating composition according to embodiment X of the invention containing a polyurethane polymer having chain-pendant hydrazone functional groups and a non-polyurethanic non-vinylic dialdehyde compound.

The hydrazone-functional diol used in this example was prepared according to the procedure described in Example 3. This compound has the following structure:

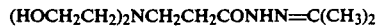

$(HOCH_2CH_2)_2NCH_2CH_2CONHN=C(CH_3)_2$

A urethane prepolymer with chain pendant hydrazone functional groups, using N-methylpyrrolidone as solvent, was made using the following recipe:

|  | parts |
| --- | --- |
| polyol:polypropylene glycol (mol wt 1962) | 263.23 |
| hydrazone compound (as above) | 36.00 |
| N-methylpyrrolidone | 66.49 |
| isophorone diisocyanate | 267.77 |
| catalyst: Ferro 820 (tin based) | 0.18 |
| dimethyl propionic acid | 33.00 |

The polyol, the hydrazone compound, the solvent and the diisocyanate were mixed and half the amount of the catalyst was added. The system was heated for 1 hour at 79° C. and then the dimethylol propionic acid and the remaining part of the catalyst was added. The system was heated for at least 1 hour at 90° C. until the level of NCO groups dropped to 8.91%. The resulting prepolymer was neutralized with 24.90 parts triethylamine and dispersed in a solution of 4.82 parts triethylamine in 1025.20 parts water contained in a reactor. Dispersing the urethane prepolymer took 45 minutes. After adding the neutralized prepolymer dispersion, a solution of 30.71 parts hydrazine monohydrate in 30.71 parts water was added to the reactor, causing chain extension to form the polyurethane polymer having hydrazone functional groups.

The resulting dispersion had a pH of 8.0, a Brookfield viscosity of 24 cps, and a solids content of 33%.

When 100 parts of this polyurethane dispersion were treated with 9.05 parts of a 5% solution of glutaric dialdehyde in water, films formed from the resulting compositions (now being according to the invention) on glass-plates exhibited an increase in ethanol double-rub resistance of from 8 to 150 double-rubs, an increase in König hardness of from 84 seconds to 100 seconds and an increase in 100% modulus of from 35.3 N/mm² to 41.6 N/mm², the lower values being those obtained using the same tests (under the same conditions) on films formed from the dispersion without any dialdehyde therein.

EXAMPLE 8

This example describes the preparation of an aqueous-based selfcrosslinking coating compositions according to embodiment X of the invention containing a polyurethane polymer having chain-pendant carbonyl functional groups and a non-polyurethanic non-vinylic bishydrazine compound.

The carbonyl functional diol used in this example was prepared according to the procedure described in Example 2. This compound has the following structure:

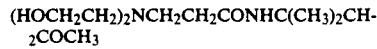

$(HOCH_2CH_2)_2NCH_2CH_2CONHC(CH_3)_2CH_2COCH_3$

A urethane prepolymer with chain pendant carbonyl functional groups, using N-methylpyrrolidone (NMP) as solvent, was prepared using the following recipe:

|  | parts |
|---|---|
| polyol: Oxyflex S 1063-120* | 253.49 |
| carbonyl compound (61.8% in NMP) as above | 58.22 |
| isophorone diisocyanate | 277.51 |
| N-methylpyrrolidone | 127.51 |
| catalyst: Ferro 820 (tin based) | 0.18 |
| dimethylol propionic acid | 33.0 |

*polyester polyol of mol. wt. 910

The polyol, the carbonyl compound, the solvent and the diisocyanate were mixed and half the amount of the catalyst was added. The system was heated for 1 hour at 85° C. then the dimethylol propionic acid and the remaining part of the catalyst were added. The system was heated for at least 2 hours at 90° C. until the level of the NCO groups dropped to 6.62%. The resulting prepolymer was neutralized with 12.35 parts of triethylamine and dispersed in a solution of 12.35 parts of triethylamine in 936.64 parts of water contained in a reactor. Dispersing the urethane prepolymer took 100 minutes. Simultaneously with the (partly) neutralized prepolymer dispersion, a solution of 28.71 parts of hydrazine monohydrate in 56.48 parts of water was fed to the reactor, causing chain extension to form the polyurethane polymer having chain-pendant carbonyl groups.

The resulting dispersion had a pH of 8.5, a Brookfield viscosity of 85 cps and a solids content of 34.4%.

When 100 parts of this polyurethane dispersion were treated with 7.39 parts of a 5.0% solution of adipic acid hydrazide in water(pH=8.5), films formed from the resulting composition (now being according to the invention) on glass-plates exhibited an increase in ethanol double rubs resistance of from 46 to at least 200 double-rubs, the lower value being that obtained used the same tests (under the same conditions) on films formed from the dispersion without any dihydrazide therein.

EXAMPLE 9

This example describes the preparation of an aqueous-based selfcrosslinkable coating composition according to embodiment Z of the invention containing a polyurethane polymer having pendant carbonyl-functional groups, a non-polyurethanic non-vinylic bishydrazine compound, and an acrylic copolymer (being an example of a vinyl polymer as we define it in this specification) having pendant carbonyl-functional groups.

A carbonyl-functional diol was prepared from the following mixture of compounds.

|  | parts |
|---|---|
| diethanolamine | 37.24 |
| diacetoneacrylamide | 60.00 |
| N-methylpyrrolidone | 60.00 |

This mixture was heated for 7 hours at 85° C. in a nitrogen atmosphere to give a solution of the following compound:

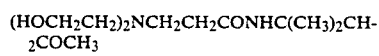

in N-methylpyrrolidone which was used (after cooling) for urethane prepolymer synthesis without any purification.

A urethane prepolymer with chain pendant carbonyl-functional groups and with an acrylic monomer as solvent was prepared using the following recipe:

|  | parts |
|---|---|
| Polyol : Terathane - 2000 | 232.68 |
| carbonyl compound in NMP (as above) | 62.06 |
| isophorone diisocyanate | 182.29 |
| n-butyl acrylate | 96.28 |
| inhibitor : Ionol CP | 0.29 |
| catalyst : Ferro 820 (tin-based) | 0.11 |
| dimethylol propionic acid | 26.39 |

The polyol, the carbonyl compound, the inhibitor together with the solvent and the isocyanate were mixed and half the amount of the catalyst was added. The system was heated for 1 hour at 77° C. and then the dimethylol propionic acid and the remaining part of the catalyst were added. The system was heated for at least 1 hour at 86° C. until the level of NCO groups dropped to 5.01%.

The prepolymer was neutralised with 19.93 parts triethylamine and dispersed in a reactor containing a solution of 0.5 parts triethylamine in 1301.55 parts water. Dispersing the urethane prepolymer took 45 minutes. After dispersion a solution of 17.06 parts hydrazine monohydrate in 25 parts water was added, causing chain extension to form the polyurethane polymer.

The dispersion had a pH of 8.1, a Brookfield viscosity of 7.5 cps, and a solids content of 25%.

An acrylic polymer having pendant carbonyl functional groups was formed in the presence of the polyurethane polymer using the following process.

A 2 liter reactor (under nitrogen) was charged with 700.00 parts of the polyurethane dispersion (as prepared above), and to this dispersion a mixture of 1.6 parts tertiary butylhydroperoxide, 0.03 parts ammonia (12.5%) and 242.22 parts water was added. To this dispersion was added 7.7 parts of a 1.0% iso-ascorbic acid solution in water (neutralized with ammonia). The reactor temperature was raised to 85° C. At this temperature the monomer feed listed below was fed in over 90 minutes. Together with the monomer feed, 69.3 parts of a 1.0% iso-ascorbic acid solution (neutralized) was also added, this being fed in over 100 minutes. When the iso-ascorbic acid feed had been completed, the reaction medium was kept at 90° C. for 30 minutes before cooling.

|  |  | parts |
|---|---|---|
| Monomer feed: | n-butyl acrylate | 20.90 |
|  | n-butyl methacrylate | 74.61 |
|  | methyl methacrylate | 52.97 |
|  | diacetoneacrylamide | 8.21 |
|  | N,N-dimethylethanolamine | 0.18 |

The resulting dispersion had a polyurethane: acrylic polymer ratio of 4:6, a pH of 9.4, a Brookfield viscosity of 15.5 cps, and the solids content was 34.7%.

When 100 parts of this dispersion were treated with 18.54 parts of a 5% solution of adipic acid dihydrazide in water (pH 8.5), films formed from the resulting composition (now being according to the invention) exhibited an increase in the 100% modulus of from 30.1

N/mm² to 41.6 N/mm², the lower value being that obtained using the same test (under the same conditions) on films formed from the dispersion without any dihydrazide therein.

EXAMPLE 10

This example describes the preparation of an aqueous-based selfcrosslinking coating composition according to embodiment Z of the invention containing a polyurethane polymer having chain-pendant carbonyl-functional groups and a non-polyurethanic non-vinylic bishydrazine compound, and an acrylic copolymer (being an example of a vinyl polymer) having pendant carbonyl functional groups.

The carbonyl-functional diol was prepared according to the procedure described in Example 9. This compound has the following structure:

(HOCH$_2$CH$_2$)$_2$NCH$_2$CH$_2$CONHC(CH$_3$)$_2$CH$_2$COCH$_3$

A urethane prepolymer with chain-pendant carbonyl-functional groups and with an acrylic monomer as solvent was prepared using the following recipe:

|  | parts |
|---|---|
| polyol: Terathane 2000 | 776.03 |
| carbonyl compound (61.84% in N-methylpyrrolidone) | 206.99 |
| isophorone diisocyanate | 607.98 |
| solvent: N-butyl acrylate | 321.10 |
| inhibitor: Ionol CP | 0.20 |
| catalyst: Ferro 820 (tin based) | 0.40 |
| dimethylol propionic acid | 88.00 |

The polyol, the carbonyl compound, the inhibitor together with the solvent and the diisocyanate were mixed and half the amount of the catalyst was added. The system was heated for 1 hour at 77° C. before the dimethylol propionic acid and the remaining part of the catalyst were added. The system was heated for 1 hour at 86° C. until the level of NCO groups had dropped to 5.01%. The prepolymer was neutralized with 63.13 neutralized with 63.13 parts triethylamine and dispersed in a reactor containing a solution of 3.33 parts triethylamine in 4340.93 parts water. Dispersing the urethane prepolymer took 45 minutes. After dispersion a solution of 57.23 parts hydrazine monohydrate in 83.38 parts water was added, causing chain extension to form the polyurethane polymer having chain-pendant carbonyl groups.

The resulting dispersion had a pH of 8.1, a Brookfield viscosity of 7.5 cps, and a solids content of 25%.

An acrylic copolymer having chain-pendant carbonyl functional groups was formed in the presence of the polyurethane polymer using the following process. A reactor (under a nitrogen atmosphere) was charged with 700.00 parts of the polyurethane dispersion (as prepared above), and to this dispersion 3.43 parts of allyl methacrylate, 207.22 parts water and a mixture of 0.82 parts ammonia (12.5%) and 1.60 parts tertiary butylhydroperoxide were added. To the resulting dispersion 7.78 parts of a 1.0% iso-ascorbic acid solution in water (pH adjusted to 7.5 with ammonia) was added before heating the reactor to the reaction temperature of 85° C. When this temperature had been reached the first monomer feed (see below) was fed in over a period of 60 minutes, and the second monomer feed (see below) was fed in over a period of 30 minutes. Simultaneously with the monomer feeds 70.04 parts of a 1.0% solution of iso-ascorbic acid in water (neutralized) was also added, this being fed over 100 minutes. When the iso-ascorbic acid feed had been completed, the reaction medium was kept at 85° C. for another 30 minutes before cooling.

|  | parts |
|---|---|
| First monomer feed |  |
| n-butyl acrylate | 19.02 |
| n-butyl methacrylate | 71.50 |
| methyl methacrylate | 50.76 |
| diacetoneacrylamide | 8.21 |
| hydroxy ethylmethacrylate | 8.21 |
| N,N-dimethylethanolamine | 0.18 |
| Second monomer feed |  |
| n-butyl acrylate | 8.15 |
| n-butyl methacyrlate | 30.64 |
| methyl methacrylate | 21.75 |
| diacetoneacrylamide | 2.05 |
| hydroxy ethylmethacrylate | 2.05 |
| N,N-dimethylethanolamine | 0.08 |

The resulting dispersion had a polyurethane:acrylic ratio of 4:6, a pH of 8.4, a Brookfield viscosity of 50.5 cps and a solids content of 35%.

When 100 parts of this dispersion were treated with 9.71 parts of a 5% solution of adipic acid dihydrazide in water(pH=8.5), films formed from the resulting composition (now being according to the invention) on glass-plates exhibited an increase in ethanol double rub resistance of from 55 to at least 200 double-rubs, an increase in methyl ethyl ketone (MEK) double rub resistance of from 142 to at least 200 double rubs, and an increase in König hardness of from 88 seconds to 106 seconds, the lower values being those obtained using the same tests (under the same conditions) on films formed from the dispersion without any dihydrazide therein.

EXAMPLE 11

This example describes the preparation of an aqueous-based selfcrosslinking coating composition according to embodiment Y of the invention containing an acrylic polymer having pendant carbonyl functional groups and a polyurethane polymer having pendant hydrazine functional groups.

A carbonyl functional acrylic polymer latex was prepared as follows. To a three necked flask provided with an agitator, reflux condenser, dropping funnel and nitrogen inlet tube, was added 1082.86 parts of water, 4.06 parts of sodium hydrogen carbonate, 3.66 parts of potassium persulphate and 66.61 parts of a 30% emulsifier (Akyposal NLS) solution. To this vessel was added 10% of the monomer feed set out below. Under a nitrogen atmosphere, the temperature of the contents of the vessel was brought to 87° C. (while stirring). When this temperature had been reached, the remaining part of the monomer feed was added in 60 minutes at the same temperature. When the monomer feed addition had been completed, the temperature was kept at 85° C. for another hour before cooling to room temperature.

|  |  | parts |
|---|---|---|
| Monomer feed: | butyl acrylate | 263.90 |
|  | methyl methacrylate | 450.93 |
|  | methacrylic acid | 48.74 |

-continued

| | parts |
|---|---|
| diacetone acrylamide | 48.74 |

Using 30.5 parts ammonia (12.5%), the pH of the medium was adjusted to 8.5. The solids content of the polymer emulsion was 42%.

The hydrazine functional polyurethane polymer dispersion employed in this example was taken from the same stock of the dispersion of polyurethane polymer having pendant hydrazine groups prepared in Example 5.

The coating composition of this example was made by adding 100.00 parts of the above-described carbonyl functional acrylic emulsion to 78.63 parts of the above-described hydrazine functional polyurethane dispersion and 20.90 parts of water. The final latex had a solids content of 35%.

Films formed from this composition were compared with films cast from a series of comparative compositions denoted by C1, C2, C3, and C4 the results being given in the following table (all films were 28 microns in thickness). The nature of these comparative compositions was as follows.

C1. This was the carbonyl functional acrylic polymer latex used in Example 11 without anything else being added.

C2. This was a polyurethane polymer dispersion having neither hydrazine (or hydrazone) nor carbonyl functional groups, and was prepared, using N-methylpyrrolidone as solvent according to the following recipe:

| | parts |
|---|---|
| polyol: Terathane 2000 | 750.72 |
| isophorone diisocyanate | 383.28 |
| dimethylpropionic acid | 66.00 |
| N-methylpyrrolidone | 299.82 |
| catalyst: Ferro 820 (tin based) | 0.18 |

The polyol, diisocyanate, dimethylolpropionic acid and half the amount of N-methylpyrrolidone were mixed and subsequently half the amount of catalyst was added. The system was heated for one hour at 90° C. before the second half of the catalyst was added. After another hour at 90° C., the second half of the N-methylpyrrolidone was added. The level of NCO groups had dropped to 4.75%.

The prepolymer was neutralised with 49.80 parts of triethylamine and dispersed in a reactor containing a solution of 3.87 parts triethylamine in 1818.15 parts water. Dispersing the urethane prepolymer took 1.5 hours. Simultaneously with the neutralized prepolymer dispersion, 132.49 parts of a 20% hydrazine solution were fed to the reactor, causing chain extension to form the polyurethane polymer. The resulting dispersion had a pH of 8.1, a Brookfield viscosity of 3.12 cps and a solids content of 35%.

C3. This was the hydrazine functional polyurethane polymer dispersion used in Example 11 without anything else being added.

C4. This was a composition obtained by the addition of 100.00 parts of the composition C1 to 78.63 parts of the composition C2 and 20.9 parts of water (20% solids content) i.e. it was a blend of a carbonyl functional acrylic polymer with a non-functional polyurethane polymer.

| Source of Comp. | No. of Ethanol double rubs | No. of MEK double rubs | MEK Spot Test over 15 min.* |
|---|---|---|---|
| Ex 11 | 112 | > 200 | 4–5 |
| C1 | 49 | 20 | 2 |
| C2 | 35 | ca 200 | 2 |
| C3 | 45 | > 200 | 2 |
| C4 | 52 | 130 | 0 |

*0 = bad; 5 = excellent

We claim:

1. An aqueous selfcrosslinkable coating composition comprising an aqueous dispersion which comprises at least one polyurethane polymer, wherein said composition has hydrazine (or hydrazone) functional groups and carbonyl functional groups present in the composition to provide a selfcrosslinking reaction, in which said at least one polyurethane polymer takes part, via azomethine formation from the reaction of hydrazine (or hydrazone) functional groups and carbonyl functional groups during and/or after film formation from the aqueous composition.

2. A composition according to claim 1 which composition comprises at least one polyurethane polymer bearing chain-pendant groups of one of the two types of azomethine-formable functional group, the two types being hydrazine (or hydrazone) functional groups and carbonyl functional groups, and the composition also includes functional groups of the other type of azomethine-formable functional group located in one or more of: at least one polyurethane polymer having chain-pendant groups of at least said other type, at least one non-polyurethanic non-vinylic compound having two or more groups of said other type, and at least one urethane oligomer having two or more groups of said other type.

3. A composition according to claim 2 wherein said at least one polyurethane polymer bears chain-pendant hydrazine (or hydrazone) functional groups and chain-pendant carbonyl functional groups in the same polyurethane polymer molecules.

4. A composition according to claim 2 wherein said composition comprises at least two polyurethane polymers and at least one of these bears chain-pendant hydrazine (or hydrazone) functional groups and does not bear chain-pendant carbonyl functional groups and at least one other of these bears chain-pendant carbonyl functional groups and does not bear chain pendant hydrazine (or hydrazone) functional groups.

5. A composition according to claim 2 wherein at least one polyurethane polymer in the composition bears chain-pendant carbonyl functional groups and the composition includes at least one non-polyurethanic non-vinylic polyhydrazine (or polyhydrazone) compound and/or at least one urethane oligomer having two or more hydrazine (or hydrazone) functional groups.

6. A composition according to claim 2 wherein at least one polyurethane polymer in the composition bears chain-pendant hydrazine (or hydrazone) functional groups and the composition includes at least one non-polyurethanic non-vinylic polycarbonyl compound and/or at least one urethane oligomer having two or more carbonyl functional groups.

7. A composition according to claim 2 wherein the ratio of hydrazine (or hydrazone) functional groups to carbonyl functional groups in the composition is within the range of 1:50 to 50:1.

8. A composition according to claim 3 wherein said polyurethane polymer bearing both pendant carbonyl functionality and pendant hydrazine (or hydrazone) functionality present in the composition is the reaction product $P_3$ of:

V an isocyanate-terminated polyurethane prepolymer formed by reacting at least:
  (ix) an organic polyisocyanate;
  (x) a polymeric organic compound containing at least two isocyanate-reactive groups and having a weight average molecular weight in the range 400 to 6000;
  (xi) optionally an isocyanate-reactive and/or diisocyanate compound(s) bearing nonionic and/or ionic dispersing groups (or groups which may subsequently be converted to such dispersing groups); and
  (xii) optionally an organic polyol having a weight average molecular weight less than 400
VI active hydrogen-containing chain extending material;

and wherein the carbonyl and hydrazine (or hydrazone functionalities in said polyurethane polymer are incorporated by virtue of
  (e) an isocyanate-reactive compound(s) providing hydrazine (or hydrazone) functionality pendant to the polyurethane chain being included as a reactant in the formation of V and the active hydrogen-containing chain extending material being entirely or including a proportion of extending material providing carbonyl functionality pendant to the polyurethane chain; or
  (f) an isocyanate-reactive compound(s) providing carbonyl functionality pendant to the polyurethane chain being included as a reactant in the formation of V and the active hydrogen-containing chain extending material being entirely or including a proportion of extending material providing hydrazine (or hydrazone) functionality pendant to the polyurethane chain; or
  (g) an isocyanate-reactive compound(s) providing hydrazine (or hydrazone) functionality pendant to the polyurethane chain and an isocyanate-reactive compound(s) providing carbonyl functionality pendant to the polyurethane chain being included as reactants in the formation of V; or
  (h) the active hydrogen-containing chain extending material VI being entirely or including a proportion of extending material providing hydrazine (or hydrazone) functionality pendant to the polyurethane chain and extending material providing carbonyl functionality pendant to the polyurethane chain.

9. A composition according to claim 4 wherein said polyurethane polymer bearing carbonyl functionality present in the composition is the reaction product $P_1$ of:

I an isocyanate-terminated polyurethane prepolymer formed by reacting at least:
  (i) an organic polyisocyanate;
  (ii) a polymeric organic compound containing at least two isocyanate-reactive groups and having a weight average molecular weight in the range 400 to 6000;
  (iii) optionally an isocyanate-reactive and/or diisocyanate compound(s) bearing nonionic and/or ionic dispersing groups (or groups which may subsequently be converted to such dispersing groups); and
  (iv) optionally an organic polyol having a weight average molecular weight less than 400; and
II active hydrogen-containing chain extending material;

and wherein the carbonyl functionality in said polyurethane polymer is incorporated by virtue of
  (a) an isocyanate-reactive compound(s) providing carbonyl functionality being included as a reactant in the formation of I, and/or
  (b) the active hydrogen-containing chain extending material II being entirely or including a proportion of extending material providing carbonyl functionality pendant to the polyurethane polymer chain.

10. A composition according to claim 4 wherein said polyurethane polymer bearing hydrazine (or hydrazone) functionality present in the composition is the reaction product $P_2$ of:

III an isocyanate-terminated polyurethane prepolymer formed by reacting at least:
  (v) an organic polyisocyanate;
  (vi) a polymeric organic compound containing at least two isocyanate-reactive groups and having a weight average molecular weight in the range 400 to 6000;
  (vii) optionally an isocyanate-reactive and/or diisocyanate compound(s) bearing nonionic and/or ionic dispersing groups (or groups which may subsequently be converted to such dispersing group); and
  (viii) optionally an organic polyol having a weight average molecular weight less than 400; and
IV active hydrogen-containing chain extending material;

and wherein the hydrazine (or hydrazone) functionality in said polyurethane polymer is incorporated by virtue of
  (c) an isocyanate-reactive compound(s) providing hydrazine (or hydrazone) functionality pendent to the polyurethane chain being included as a reactant in the formation of III, and/or
  (d) the active hydrogen-containing chain extending material IV being entirely or including a proportion of extending material providing hydrazine (or hydrazone) functionality pendant to the polyurethane chain.

11. A composition according to claim 1 wherein said composition comprises at least one polyurethane polymer and at least one vinyl polymer and there are chain-pendant carbonyl and chain-pendant hydrazine (or hydrazone) functional groups which are complementarily incorporated in the polyurethane and vinyl polymers to provide a selfcrosslinking reaction via azomethine formation during and/or after film formation from the aqueous composition.

12. A composition according to claim 11 wherein said at least one polyurethane polymer bears chain-pendant carbonyl functional groups and said at least one vinyl polymer bears chain-pendant hydrazine (or hydrazone) functional groups.

13. A composition according to claim 11 wherein said at least one polyurethane polymer bears chain-pendant hydrazine (or hydrazone) functional groups and said at least one vinyl polymer bears chain-pendant carbonyl functional groups.

14. A composition according to claim 11 wherein said at least one polyurethane polymer bears both chain-pendant carbonyl functional groups and chain-pendant hydrazine (or hydrazone) functional groups, and wherein either said at least one vinyl polymer bears either chain-pendant hydrazine (or hydrazone) functional groups or chain-pendant carbonyl functional groups, or the composition includes at least two vinyl polymers at least one of which bears chain-pendant hydrazine (or hydrazone) functional groups and at least one of which bears chain-pendant carbonyl groups.

15. A composition according to claim 11 wherein the ratio of hydrazine (or hydrazone) functional groups to carbonyl functional groups in the composition is within the range of 1:20 to 20:1.

16. A composition according to claim 11 wherein the weight ratio of said at least one polyurethane polymer to said at least one vinyl polymer is within the range of from 9:1 to 1:9.

17. A composition according to claim 12 wherein said vinyl polymer bearing chain-pendant hydrazine (or hydrazone) functional groups present in the composition is the product $V_2$ formed by reacting at least:

VII a free radical addition polymer formed by polymerizing at least one olefinically unsaturated monomer providing chain-pendant hydrazinolysable groups; and VIII a hydrazine-yielding agent, whereby at least a proportion of the chain-pendant hydrazinolysable groups in VII are converted to hydrazine functional groups.

18. A composition according to claim 13 wherein said vinyl polymer bearing chain-pendant carbonyl functionality present in the composition is the product $V_1$ formed by the free-radical polymerisation of at least one carbonyl-containing monoethylenically unsaturated monomer with at least one other olefinically unsaturated monomer, being a monomer not providing carbonyl functionality.

19. A composition according to claim 1 wherein said composition comprises at least one polyurethane polymer and at least one vinyl polymer and wherein either:

A. the at least one polyurethane polymer and the at least one vinyl polymer both bear chain-pendant carbonyl functional groups and the composition includes at least one non-polyurethanic non-vinylic polyhydrazine (or polyhydrazone) compound and/or at least one urethane oligomer having at least two hydrazine (or hydrazone) functional groups, or B. the at least one polyurethane polymer and the at least one vinyl polymer both bear chain-pendant hydrazine (or hydrazone) functional groups and the composition includes at least one non-polyurethane non-vinylic polycarbonyl compound and/or at least one urethane oligomer having at least two carbonyl functional groups;

and wherein said carbonyl functional groups and polyhydrazine (or polyhydrazone) compound(s) in A, or said hydrazine (or hydrazone) functional groups and polycarbonyl compound(s) in B, provide a selfcrosslinking reaction, in which both the polyurethane and vinyl polymers take part, via azomethine formation during and/or after film formation from the aqueous composition.

20. A composition according to claim 19 wherein the ratio of hydrazine (or hydrazone) functional groups to carbonyl functional groups in alternative A is within the range of from 1:50 to 1.6:1 and in alternative B is within the range of from 50:1 to 1:1.6.

21. A composition according to claim 1 which composition includes a dispersion of another polymer.

* * * * *